United States Patent [19]

Litchield et al.

[11] 4,332,842

[45] Jun. 1, 1982

[54] PRODUCTION OF BELTING

[75] Inventors: Peter J. Litchield, Leyland; John K. Taylor, Chorley, both of England

[73] Assignee: TBA Industrial Products Limited, England

[21] Appl. No.: 96,123

[22] Filed: Nov. 20, 1979

[30] Foreign Application Priority Data

Nov. 22, 1978 [GB] United Kingdom ............... 45621/78

[51] Int. Cl.³ .......................... B05D 1/18; B05D 3/02; B05D 3/12
[52] U.S. Cl. .................................... 427/176; 427/316; 427/434.4
[58] Field of Search ............ 427/176, 173, 316, 434.4; 118/33; 28/169; 26/18.5, 18.6

[56] References Cited

U.S. PATENT DOCUMENTS

| | | | |
|---|---|---|---|
| 316,906 | 4/1885 | Mullen et al. | 427/176 |
| 1,228,458 | 6/1917 | McGiehan | 427/366 |
| 1,862,749 | 6/1932 | Hill et al. | 427/173 |
| 2,138,876 | 12/1938 | Novak | 28/169 |
| 2,780,459 | 2/1957 | Landquist | 26/18.5 X |
| 2,844,488 | 7/1958 | Meherg et al. | 427/173 |
| 4,052,521 | 10/1977 | Ferrari | 427/176 X |

FOREIGN PATENT DOCUMENTS

| | | | |
|---|---|---|---|
| 413299 | 7/1934 | United Kingdom | 427/176 |
| 1199588 | 7/1970 | United Kingdom | 26/18.5 |

Primary Examiner—Evan K. Lawrence
Attorney, Agent, or Firm—William A. Drucker

[57] ABSTRACT

Solid woven conveyor belting is produced by a process which includes the steps of subjecting the fabric carcass to a plurality of alternating changes of direction while immersed in a bath of impregnant material, and then heating the carcass to gel the impregnant. Each of the alternating changes of direction are effected by causing the carcass to follow a generally curved path whose radius of curvature is appreciably less than 75 mm. Prior to immersion, a synthetic polymeric yarn-containing carcass is subjected to a shrinking treatment effective to close the interstices of said carcass to some extent to reduce the impregnant material expelled upon subsequent heating to gel the impregnant.

9 Claims, 1 Drawing Figure

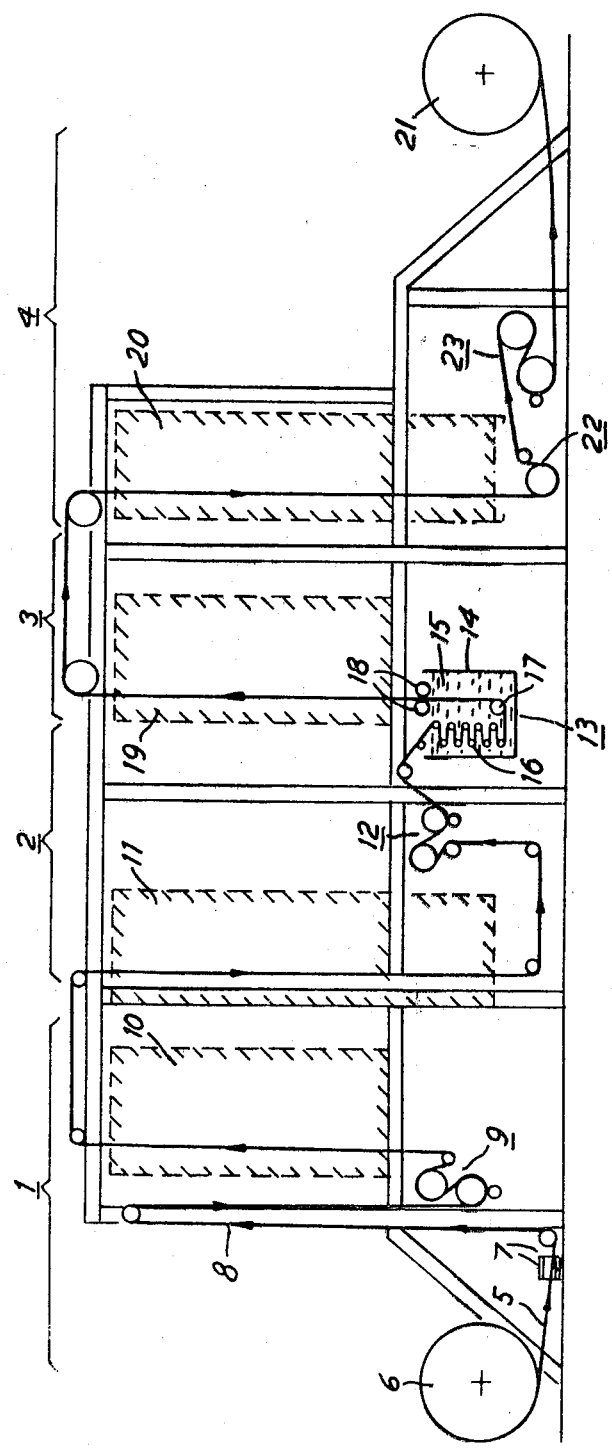

PRODUCTION OF BELTING

This invention relates to the production of solid woven conveyor belting. The term "solid woven" in the present context denotes a fabric carcass comprised of a plurality of yarns simultaneously woven and linked together to form a thick, multiply fabric. To produce belting from such a solid woven carcass it is necessary to impregnate the carcass in order to obtain the necessary mechanical properties, the impregnant formulation being also selected to confer properties such as fire resistance and/or static electricity dissipation characteristics, as required for a particular end use. The impregnated carcass may also be given surface coatings ("covers") where necessary to meet end use requirements such as abrasion resistance and load carrying capability.

The impregnant and cover materials usually employed are plastisols of homopolymers and/or copolymers of PVC, such as PVDC and PVAc, although polyurethanes and/or other polymers available in suitable liquid or paste form may also be employed. The term "PVC" is used herein for convenience to encompass all such materials.

However, solid woven fabrics of the kind useful for the conveyor belting tend to be very difficult to impregnate due to their highly compact and dense structure. Typical carcass thicknesses would be in the range 5 to 15 mm for final belt tensile strengths of about 400 to 1800 KN/m. Prior proposals to overcome this difficulty in adequately impregnating solid woven carcasses have included "wet weaving", in which the warp yarn is impregnated with PVC paste during or prior to weaving. This is inconvenient because the paste tends to be displaced from the warp by the action of the loom. It has also been suggested that conventional dry weaving should be followed by impregnation under vacuum, either on a continuous or discontinuous basis.

Attempts have also been made to simply squeeze the impregnant material in liquid form into the carcass, but the latter is already so dense that application of pressure by way of squeeze rolls merely displaces the impregnant material from the surface of the carcass, without causing significant penetration. An example of such a process is found in German Pat. No. 1200782, where it is proposed to increase the effect of the treatment by driving at least some of the downstream squeeze rolls with a faster surface speed, so that slippage occurs. This technique is similar to that of an earlier German Pat. No. 531910.

According to the present invention in the production of solid woven conveyor belting by a process which includes the steps of treating a solid woven belting fabric carcass containing both natural fibers and heat shrinkable synthetic fibers with an impregnant material by subjecting said carcass to a plurality of alternating changes in direction whilst immersed in said material, and then heating the treated carcass to gel the impregnant, there is provided the improvement which comprises subjecting said carcass to a preliminary heat treatment immediately prior to immersing said carcass in said material, whereby said synthetic fibers undergo shrinkage prior to immersion in the impregnant material, said shrinkage closing the interstices of said carcass to some extent to reduce the impregnant material expelled upon subsequent heating to gel the impregnant.

It has been found that the process just recited is highly effective in securing impregnation of a solid woven carcass, even at production speeds of two meters/minute or more. This is in very marked contrast to prior art processes in which simple, prolonged immersion is used at typical production speeds of up to ½ meter/minute. Whilst at least two changes in direction appears to be the minimum necessary to properly impregnate a relatively thin carcass, ten or more successive changes in direction may be used. This would be for a relatively thick and dense carcass. It is particularly preferred that in order to counteract the frictional forces generated by each change of direction, the carcass should be positively driven through each such change of direction, for example, by positively driving each guide roller about which a particular change of direction occurs. It is also preferred that the tension in the carcass be regulated by adjusting this positive drive. In particular, a progressive build-up in tension should be avoided. Minimum tension is preferred for the impregnation step.

It is presently common practice to use a carcass containing both natural fibres, e.g. cotton and also synthetic fibres, particularly cotton/polyamide and cotton/polyester yarns in both warp and weft. Such fabrics are prone to shrink on heating and this is particularly relevant where the impregnated carcass is subsequently heated in an oven to gell the impregnant. Shrinkage tends to expel the impregnant from the carcass to form a nodular surface layer which is very difficult to treat by post-coating or pressing to obtain a surface layer having the appropriate properties. This is particularly true where a PVC material is used.

The process includes the step of applying a shrinkage treatment to a carcass including synthetic polymeric yarn, prior to subjecting it to passage through the impregnant material. Contrary to expectation, it has been found that this shrinking treatment, although to some extent closing the interstices of the fabric does not significantly affect the subsequent impregnation step. If necessary, a further change or number of changes in direction can be used by way of compensation for the increase in carcase density caused by shrinking.

Shrinking before impregnating has at least one further advantage in that it facilitates close control of the properties of the finished belting. The final extensibility of the belt may be increased by shrinking the carcass before impregnation and reduced by the application of controlled tension during impregnation, during subsequent heating to gel the impregnant, and/or during any subsequent processing steps, including a final pressing treatment. It follows that the process of the invention can be used to produce belting having controlled stretch characteristics. For example, a high-stretch belting having good impact resistance can be made by deliberately avoiding undue tension after the shrinking treatment, so that the effect of the latter is not "pulled out" of the carcass. In this context, the ability to control frictional forces and the build-up of tension in the carcass during treatment in the bath of impregnant material is important since it greatly facilitates accurate control of the elongation and thickness properties of the belting, since both thickness and elongation ("stretch") are closely dependant on the tension applied in the various stages of processing. As mentioned earlier, this tension control can be accomplished in part by positively driving the carcase through each change of direction in impregnant. Preferably the changes of direction are in vertically disposed sine-wave relation to one another. This is useful in at least one respect, namely that the level of the impregnant in the bath can be used to adjust the pick-up of impregnant by the fabric.

Although the process of the present invention is capable of impregnating a carcass at very significantly increased speed, the maximum speed is limited by the capability of the following oven, which is used to gell the impregnant. Using a typical PVC plastisol as impregnant, at a temperature of 20° C.±3° C. to maintain a reasonably constant viscosity, the gelling oven must be capable of raising the impregnated carcass temperature to 160°–200° C., a temperature of 170° C. being particularly preferred to give adequate gelling without decomposition. "Adequate gelling" in this present context means that the PVC resin more or less completely dissolves in the plasticiser liquid in which it is suspended, to give solid, homogeneous PVC resin to which a final, cover layer of the same, or a different PVC resin can be applied, prior to gelling this cover layer and then pressing to form the final product, which only requires minor finishing operations such as edge trimming. It will be appreciated that a complete production process according to the invention will normally comprise at least three quite discrete steps. Initially, the solid-woven carcass is subjected to a heat treatment under controlled tension effective to cause the synthetic fibre components to shrink. This pre-shrunk carcass is then impregnated and the impregnant gelled by heating, both under controlled tension.

In order that the invention be better understood a preferred embodiment of it will now be briefly described by way of example with reference to the accompanying drawing in which the FIGURE is a schematic cross-sectional side view of a complete belting production line used to carry out the process of the invention.

The production line shown in the FIGURE may conveniently be considered as having four discrete sections, the first being a carcass supply, tension control and pre-shrinking section, 1. This is followed by a cooling zone and speed control section, 2, which is in turn followed by an impregnation and gelling section, 3. Finally, a further cooling zone, tension control and reel-up section, 4, is provided.

In section 1, belting carcass 5 is supplied from a roll 6 through a clamp 7, an accumulator 8 and a friction brake 9, which provides control of the carcass tension entering a pre-shrinking oven 10. In the oven, the carcass is exposed to hot air and heating sufficient to shrink the synthetic fibre components(s) of the carcass, the extent of the shrinkage being a function of temperature and tension. From the oven, the hot carcass passes into the second section, entering a cooling zone 11 in which it is exposed to jets of air at ambient temperature. This is immediately followed by speed control/drive rollers 12 which act in conjunction with the brake 9 to control the tension, both through the pre-shrinking oven 10 and into the following impregnator, 13. The latter comprises a tank 14 containing PVC plastisol 15 and an array of rollers 16 around which the carcass passes in a sinusoidal path before being led out of the tank by a guide roller 17 to squeeze rollers 18, which remove excess plastisol. The rollers 16 are all positively driven (by a variable spped drive which is not shown, in the interests of clarity), the drive speed being regulated as will be discussed later.

The rollers 16 in this case were of diameter 75 mm and the guide roller 17 was 150 mm in diameter. From the squeeze rollers 18, the impregnated carcass enters a vertically disposed gelling oven 19, in which it is subjected to hot air heating. The oven is followed by a cooling chamber, 20, in which jets of air at ambient temperature are used to cool the belting which is then collected on a reel, 21, after passage around a set of drive/tension rollers 22, 23. The latter co-operate with the rollers 16 to establish control of the tension during the gelling/cooling treatments. The tension in the carcass is contiuously monitored, both before impregnation and after the gelling oven, the outputs of the monitoring system being employed to adjust the various drive, brake and tension control rollers so as to maintain the tension both constant and at pre-chosen levels in each section. The drive speed of the impregnator rollers 16 is also controlled by the same means, being automatically adjusted to minimise the build-up of tension during actual impregnation. Because the apparatus provides for tension control in each stage of processing, it enables the elongation properties of the final product to be "tailored" to a particular end use.

Whilst the product as collected on the reel 21 will usually require the application of cover layers of the same or a different PVC resin, according to the properties required for the end use, this is not necessarily an essential feature of the process. It may only be necessary to trim the edges of the product if the surface characteristics are satisfactory. However, in this context, it should be noted that the squeeze rollers 18 may be configured to leave sufficient plastisol on the surfaces of the impregnated carcass to provide cover layers on the final product. These cover layers would normally be of the same PVC as is used in the tank 14 to impregnate the carcass, but it is to be understood that by including an ancillary coating unit between the squeeze rollrs and the gelling oven, a different PVC may be applied to the surfaces and gelled at the same time as the impregnant, provided, of course, that the oven 19 has sufficient capacity for this purpose.

Where the PVC surface coatings are applied subsequently, they may be gelled by passage through an oven as described above or they may at least partly gelled prior to final gelling, for example, in a conventional belting press. However, the use of the latter is not essential if the oven 19 has sufficient capacity. The process of the invention may therefore replace a part or the whole of a conventional belting plant. In order that the invention be better understood, use of the apparatus of the FIGURE is illustrated by the following Examples.

EXAMPLE 1

A high strength belting was made from a carcass of thickness 8.5 mm solid woven from cotton-polyamide composite yarns to a fabric density of 4.6 Kg/meter$^2$. This was processed into belting on the apparatus of the FIGURE at a speed of 1 meter/minute. The pre-shrinking oven temperature was 150° C. and the shrinkage developed was about 3½%. After cooling to room temperature, the carcass was impregnated by subjecting it to ten successive alternating changes of direction in a PVC homopolymer plastisol of viscosity 15 poise. The pick-up was about 80% by weight. After squeezing off the excess with the rollers 18, the PVC was gelled at 170° C. for about 4 minutes before cooling and reeling. The preshrinking/cooling tension was approximately 100 Kg/m and the gelling/cooling tension was approximately 400 Kg/m, the impregnation tension being approximately 50 kg/m.

Final surface coatings of a PVC plastisol were applied subsequently in this case and gelled by hot pressing. The strength of the product was 1140 KN/meter.

EXAMPLE 2

A medium strength belting was produced from a similar solid woven carcass 6.8 mm thick and of density 3.3 Kg/meter$^2$. This was pre-shrunk at 200° C. at a production speed of 2 meters/minute to give a shrinkage of about 3%. Impregnation was carried out by treating the carcass as before in a PVC homopolymer plastisol of viscosity 15 poise. The pick-up was about 120% by weight and gelling was carried out at 180° C. for approximately minutes. Final coatings were applied as before and the product strength was about 700 KN/m. The shrinking cooling, impregnation and gelling/cooling tensions were all held at approximately 100 Kg/m in this Example.

It will be appreciated that in both examples, the need for subsequent cover layers to be applied was a consequence of end use requirements, since the product prior to application of these layers would have been suitable for some uses.

We claim:

1. In the production of solid woven conveyor belting by a process which includes the steps of treating a solid woven belting fabric carcass containing both natural fibers and heat shrinkable synthetic fibers with an impregnant material by subjecting said carcass to a plurality of alternating changes in direction whilst immersed in said material, and then heating the treated carcass to gel the impregnant, the improvement which comprises subjecting said carcass to a preliminary heat treatment immediately prior to immersing said carcass in said material, whereby said synthetic fibers undergo shrinkage prior to immersion in the impregnant material, said shrinkage closing interstices of said carcass to some extent to reduce the impregnant material expelled upon subsequent heating to gel the impregnant.

2. The process of claim 1, including the step of positively driving said carcass through each of said changes of direction.

3. The process of claim 2, including the step of adjusting said positive drive so as to regulate tension in said carcass.

4. The process of claim 3 wherein said step of adjusting the positive drive is also carried out so as to minimize a progressive build-up of tension in said carcass as it passes through said changes of direction.

5. The process of claim 1 wherein said heat treatment is carried out under tension, whereby the degree of shrinkage prior to immersion in said impregnant material is controlled.

6. The process of claim 1 further including the steps of applying cover layers of the same or a different impregnant material to the treated carcass, followed by applying a further heat treatment thereto, whereby said cover layers are caused to gel.

7. A process for the production of solid woven conveyor belting from a solid woven belting fabric carcass containing natural and heat-shrinkable synthetic fibers, said process comprising the steps of subjecting said fabric carcass to a preliminary heat treatment under controlled tension, whereby at least said synthetic fibers are caused to shrink in controlled manner said shrinkage closing the interstices of said fabric carcass to some extent, followed by immersing said fabric carcass in a bath of heat gellable PVC impregnant material to fill interstices of said carcass with said material, the extent of said closing being such as to reduce the impregnant material expelled upon subsequent heating to gel the impregnant, and whilst in said bath positively driving said fabric at and through each of a plurality of alternating changes in direction, each generated by causing said fabric carcass to follow a generally curved path whereof the radius of curvature is of the order of from 35 to 40 mm. and adjusting said positive drive whereby to minimize a progressive build-up of tension in said fabric carcass as it passes through said changes in direction, removing said fabric carcass from said bath and subjecting it to a heat treatment whereby the PVC impregnant therein is caused to gel, followed by applying a cover layer of further heat-gellable material to at least one face of the fabric carcass and thereafter exposing said carcass to a further heat treatment whereby said cover layer is gelled and fused with said PVC impregnant material.

8. The process of claim 7, wherein said heat treatment, the application of the cover layer and said further heat treatment are all carried out under controlled tension, whereby the elongation properties of the final belting product are regulated within a desired range.

9. The process of claim 7 wherein said alternating changes of direction have a generally sinusoidal configuration and the axis of the sine wave is substantially vertically disposed, whereby the degree of carcass immersion in the impregnant material can be adjusted by altering the level of said material relative to said changes of direction.

* * * * *